United States Patent
Lee et al.

(10) Patent No.: US 10,218,852 B2
(45) Date of Patent: Feb. 26, 2019

(54) METHODS AND SYSTEMS FOR PROVIDING TELECONFERENCE PARTICIPANT QUALITY FEEDBACK

(71) Applicant: FUJI XEROX CO., LTD., Tokyo (JP)

(72) Inventors: Matthew Lee, Mountain View, CA (US); Scott Carter, Menlo Park, CA (US); Heather Ashley Faucett, Irvine, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/441,053

(22) Filed: Feb. 23, 2017

(65) Prior Publication Data
US 2018/0241882 A1  Aug. 23, 2018

(51) Int. Cl.
*H04M 3/56* (2006.01)
*H04M 7/00* (2006.01)
*H04N 7/15* (2006.01)
*G06K 9/00* (2006.01)
*H04N 7/14* (2006.01)

(52) U.S. Cl.
CPC ........ *H04M 3/563* (2013.01); *G06K 9/00597* (2013.01); *H04M 3/567* (2013.01); *H04M 7/0021* (2013.01); *H04N 7/147* (2013.01); *H04N 7/15* (2013.01); *H04M 2201/50* (2013.01); *H04M 2203/256* (2013.01); *H04M 2203/303* (2013.01); *H04M 2203/305* (2013.01)

(58) Field of Classification Search
USPC ...................................................... 348/14.03
See application file for complete search history.

(56) References Cited

U.S. PATENT DOCUMENTS

| | | | |
|---|---|---|---|
| 6,363,145 B1 * | 3/2002 | Shaffer | H04M 3/2281 379/265.02 |
| 7,151,826 B2 * | 12/2006 | Shambaugh | H04M 3/51 379/265.02 |
| 2008/0084969 A1 * | 4/2008 | Moore | H04L 47/10 379/52 |
| 2011/0225247 A1 * | 9/2011 | Anantharaman | H04M 3/568 709/206 |
| 2013/0076853 A1 * | 3/2013 | Diao | H04N 7/15 348/14.08 |
| 2015/0358583 A1 * | 12/2015 | Lee | H04N 7/15 348/14.08 |

* cited by examiner

*Primary Examiner* — Amal Zenati
(74) *Attorney, Agent, or Firm* — Morgan, Lewis & Bockius LLP

(57) ABSTRACT

A method at a computing device includes obtaining time-varying teleconferencing data of a teleconference session with two or more participants, where the teleconferencing data includes one or more of audio data and video data, determining one or more participant quality signals for at least one of the participants based on the teleconferencing data, where at least one of the participant quality signals varies over time; determining for at least one of the participants participant quality metrics based on the participant quality signals; and providing to at least one of the participants information corresponding to the participant quality metrics, where the information is provided in one or more of graphical, textual, and audible form.

20 Claims, 9 Drawing Sheets

METHODS AND SYSTEMS FOR PROVIDING TELECONFERENCE PARTICIPANT QUALITY FEEDBACK

TECHNICAL FIELD

The present application generally describes teleconferencing technologies and more particularly methods and systems for providing to participants of a teleconference feedback regarding participant quality in the teleconference.

BACKGROUND

Collaboration between people is a long-standing practice in business and other endeavors. People working in teams and collaborating with each other can work more efficiently, and have greater potential for generating useful ideas for the work at hand. Advancements in technology have made collaboration even easier, including facilitating collaboration over long distances. A common form of collaboration using technology is meeting over a teleconference with audio and/or video.

However, a teleconference poses a set of challenges for the participants that they may not face if the meeting was in person. For example, in a video teleconference, typically the fields of view of the participants are limited by the fields of view of the cameras used in the teleconference. This may hinder the ability of the participants to perceive non-verbal cues from other participants as well as to gain a broader visual perspective of the meeting environment. Also, the remoteness of the participants presents opportunities for a participant to become distracted without the other participants' knowledge. These challenges, as well as various other participant behaviors that detract from the quality of a teleconference, affect the quality of a teleconference for the participants.

SUMMARY

In accordance with some embodiments, a method, performed at a computing device with one or more processors and memory storing one or more programs for execution by the one or more processors, includes obtaining time-varying teleconferencing data of a teleconference session with two or more participants, where the teleconferencing data includes one or more of audio data and video data; determining one or more participant quality signals for at least one of the participants based on the teleconferencing data, where at least one of the participant quality signals varies over time; determining for at least one of the participants participant quality metrics based on the participant quality signals; and providing to at least one of the participants information corresponding to the participant quality metrics, where the information is provided in one or more of graphical, textual, and audible forms.

In accordance with some embodiments, a computing device includes one or more processors and memory storing one or more programs to be executed by the one or more processors. The one or more programs include instructions for obtaining time-varying teleconferencing data of a teleconference session with two or more participants, where the teleconferencing data includes one or more of audio data and video data; determining one or more participant quality signals for at least one of the participants based on the teleconferencing data, where at least one of the participant quality signals varies over time; determining for at least one of the participants participant quality metrics based on the participant quality signals; and providing to at least one of the participants information corresponding to the participant quality metrics, where the information is provided in one or more of graphical, textual, and audible forms.

In accordance with some embodiments, a non-transitory computer readable storage medium stores one or more programs. The one or more programs include instructions, which, when executed by a computing device with one or more processors, cause the computing device to perform operations including obtaining time-varying teleconferencing data of a teleconference session with two or more participants, where the teleconferencing data includes one or more of audio data and video data; determining one or more participant quality signals for at least one of the participants based on the teleconferencing data, where at least one of the participant quality signals varies over time; determining for at least one of the participants participant quality metrics based on the participant quality signals; and providing to at least one of the participants information corresponding to the participant quality metrics, where the information is provided in one or more of graphical, textual, and audible forms.

BRIEF DESCRIPTION OF THE DRAWINGS

Like reference numerals refer to corresponding parts throughout the drawings.

DESCRIPTION OF EMBODIMENTS

Reference will now be made in detail to various embodiments, examples of which are illustrated in the accompanying drawings. In the following detailed description, numerous specific details are set forth in order to provide a thorough understanding of the invention and the described embodiments. However, the invention may be practiced without these specific details. In other instances, well-known methods, procedures, components, and circuits have not been described in detail so as not to unnecessarily obscure aspects of the embodiments.

Figure 1A:
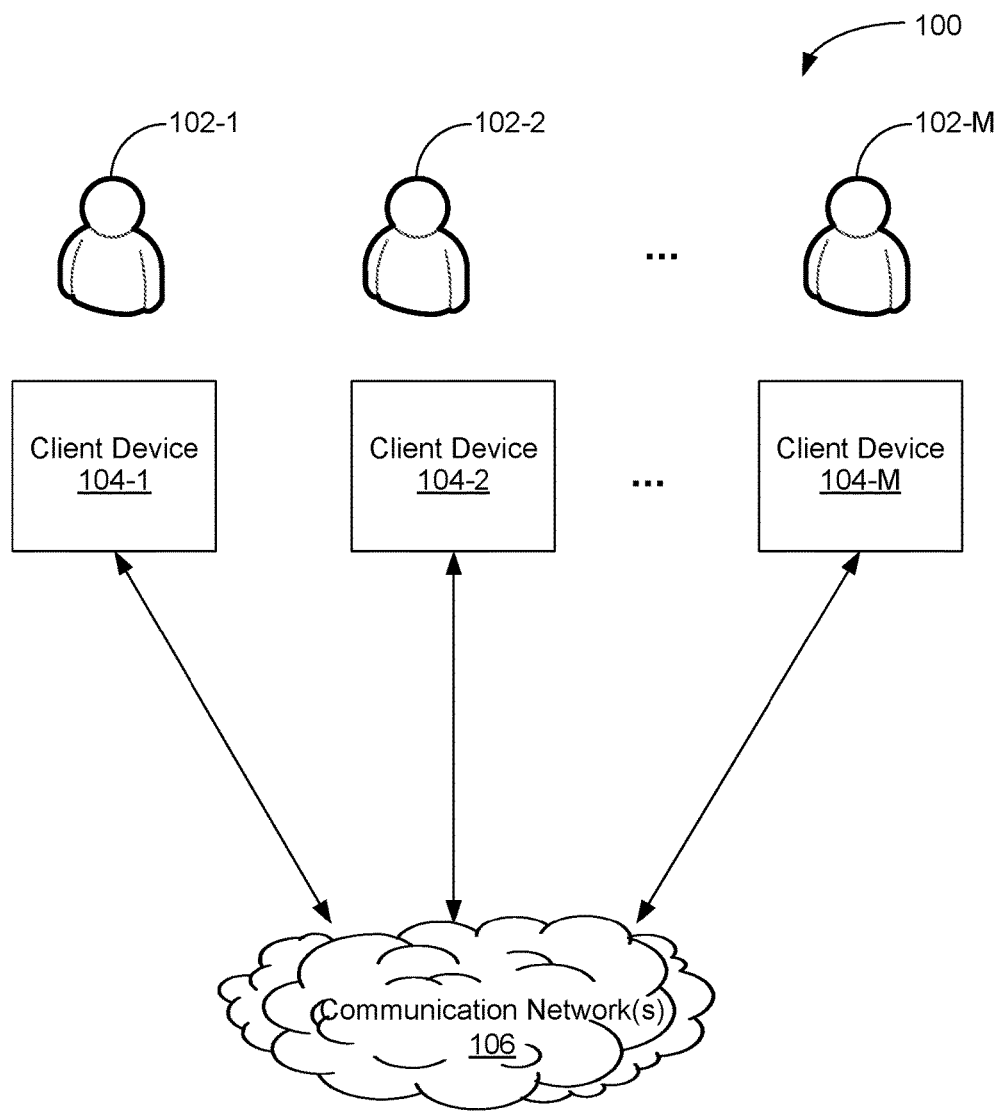
FIGS. 1A-1B are block diagrams illustrating example teleconference environments in accordance with some embodiments.

FIG. 1A illustrates a teleconference environment 100 in accordance with some embodiments. The telepresence environment 100 includes two or more client devices 104-1 thru 104-M that are remotely located from each other. Each of users 102-1 thru 102-M use and operate a respective client device 104 to participate in a teleconference session between the users 102-1 thru 102-M. In some embodiments, in the teleconference session, each client device 104 is associated with a respective user-participant 102. In some embodiments, a client device 104 may be any of a desktop computer, a laptop or notebook computer, a smartphone, a tablet device, a multimedia device, or a device in a teleconference system.

The teleconference environment 100 also includes one or more communication networks 106. The communication network(s) 106 can be any wired or wireless local area network (LAN) and/or wide area network (WAN), such as an intranet, an extranet, or the Internet. It is sufficient that the communication network(s) 106 provide communication capability between the client devices 104.

In some embodiments, a teleconference session includes audio and/or images (e.g., video, still images). In some embodiments, a client device 104 includes a microphone (e.g., microphone 216, FIG. 2A) for capturing audio (e.g., speech of a user-participant 102), and a speaker (e.g., speaker 220, FIG. 2A) for outputting audio (e.g., speech of other users 102 received from other client devices 104). In some embodiments, the client device 104 includes a camera device (e.g., camera 224, FIG. 2A) for capturing images (e.g., still images, video). In some embodiments, a client device 104 includes a display (e.g., display 222, FIG. 2A) for displaying a teleconference user interface for the user 102 and video and images received from other client device 104 in the teleconference.

In some implementations, the client devices 104 connect to each other by peer-to-peer connection to establish a teleconference session. For example, the client devices 104 may connect to each other in a peer-to-peer manner using the WebRTC framework of protocols, application programming interfaces, etc. Other suitable peer-to-peer protocols, standards, application programming interfaces, etc. may be used by client devices 104 to connect to each other in a peer-to-peer manner to establish teleconference sessions. In some embodiments, the peer-to-peer connections are made through the communication networks 106.

After the connections are made and the teleconference session is established, the client devices 104 engage in the teleconference session by transmitting to each other teleconference data for the teleconference session through the peer-to-peer connection(s). In some embodiments, the teleconference data includes audio data (e.g., user speech captured by the microphone) and video/image data (e.g., video and images captured by the camera). In some embodiments, the audio data includes one or more audio streams (e.g., for a client device 104-1, the one or more audio streams include the audio stream transmitted by the client device 104-1 to other client devices 104 and audio streams received from the other client devices 104). In some embodiments, the video/image data includes one or more video/image streams (e.g., for a client device 104-1, the one or more video streams include the video stream transmitted by the client device 104-1 to other client devices 104 and video streams received from the other client devices 104). In some embodiments, the teleconference data further include user input data (e.g., data corresponding to keystrokes, mouse clicks, and/or cursor movements by users 102 at the client devices 104), screen sharing data, documents, notes, chats, metadata, network performance data, and other information.

In some embodiments, a client device 104 processes the teleconference data to detect and determine one or more teleconference participant quality signals for one or more of the users 102 in the teleconference session. A client device 104 processes teleconference data generated at the client device 104 (e.g., the audio and video of the user-participant using the client device 104) and teleconference data received at the client device 104 (e.g., the audio and video from the other client devices in the teleconference session) to determine signals of participant behavior (e.g., conversational behavior, non-verbal behavior, etc.) that may affect the quality (e.g., conversational quality) of the teleconference for the users 102. In some embodiments, the signals include one or more behaviors of the users and one or more states of the users during the teleconference. Further details about the signals are described below.

The client device 104 determines one or more metrics based on the determined quality signals for one or more of the users 102 in the teleconference session. The metrics measure and quantify the quality signals for analysis and presentation. In some embodiments, a signal and a corresponding metric is the same. In some embodiments, a metric corresponding to a signal is a quantification of the signal.

The client device 104 generates information based on the determined metrics for presentation to the user 102. In some embodiments, the information is presented in graphical, textual, and/or audible form. For example, the client device 104 may generate visualizations (with graphics and/or text) of the metrics for display to the user. As another example, the client device 104 may generate audible notifications that can alert the user when a metric exceed a threshold.

In some embodiments, a client device 104 generates the information from the perspective of the user 102 associated with the respective client device. For example, the generated visualizations present the metrics associated with the user (e.g., length of the user's interruptions, time user spent speaking, etc.) and/or compare the user to other participants in the teleconference.

In some embodiments, the determination of signals and metrics and generation of information are based on one or more predefined rules or heuristics. The client device 104 includes (e.g., in a teleconference application) one or more definitions of signals, associated metrics, and corresponding rules, algorithms, heuristics, thresholds, and so forth for determining these signals and metrics. For example, a signal may be the position of the user's body in the field of view, an associated metric may be how much the position of the user is off-center horizontally in the field of view, and an associated threshold is a certain percentage by which the body is off-center horizontally. The client device 104 analyzes the video data in the teleconference data to determine the signal over the duration of the teleconference session (e.g., by identifying the user's body in the video data and determining its position in the field of view over the duration of the teleconference session), determines the associated metric over the duration of the teleconference session, and compares the metric with the threshold over the duration of the teleconference session. The client device 104 generates information associated with these signals and metrics for presentation to the user. The generated information may include, for example, a graphic indicating that the body position is off-center horizontally by more than the threshold, an audible notification when the body position is off-center horizontally by more than the threshold, and a chart showing for how much of the teleconference session the metric exceeded the threshold and not exceeded the threshold.

In some embodiments, the client device 104 stores (e.g., in a database) at least some of the teleconference data (e.g., the audio and video, optionally also other teleconference data) and the determined signals and metrics. The stored teleconference data and signals and metrics may be accessed after the teleconference session has ended.

In some embodiments, the client device 104 determines the signals and metrics, and generates the information, throughout the teleconference session. For example, as the teleconference session is ongoing, the client device 104 processes and analyzes the teleconference data generated and received during the teleconference session (e.g., in real time, in near real time, or periodically (e.g., every 30 seconds, every minute)) to determine the signals and metrics, and generates information based on the metrics during the teleconference session (e.g., also in real time, in near real time, or periodically). The information is presented, and may be updated, during and throughout the teleconference session (e.g., also in real time, in near real time, or periodically).

In some embodiments, the client device 104, when determining the signals and metrics, also indexes the determined signals and metrics to timestamps in the teleconference session, or otherwise tracks the timestamps when values of the signals and metrics are determined. For example, returning to the body position signal example, the client device 104 determines body position values at multiple times in the teleconference, and notes the timestamps of the times when the values are determined. The client device 104 also determines values of the corresponding metrics at multiple times in the teleconference, and notes the timestamps of the times when the values are determined. Thus, determined values of the signals and metrics have corresponding timestamps in the teleconference, so that the values at a given time in the teleconference may be obtained. In some embodiments, the values are stored with the timestamps, so that they can be accessed after the teleconference session is over.

As described above, the determined signals and metrics, and corresponding timestamps, as well as the teleconference data, are stored for access after the teleconference session is over. In some embodiments, an after-teleconference summary of the signals and metrics may be generated for presentation to the user(s) 102. The summary shows a tabulation of the signals and metrics over the teleconference and may also show how the signals and metrics change over the duration of the teleconference. In this way, the user(s) can review the signals and metrics after the teleconference is over to gain insight on their behaviors during the teleconference and make adjustments in the future.

Figure 1B:
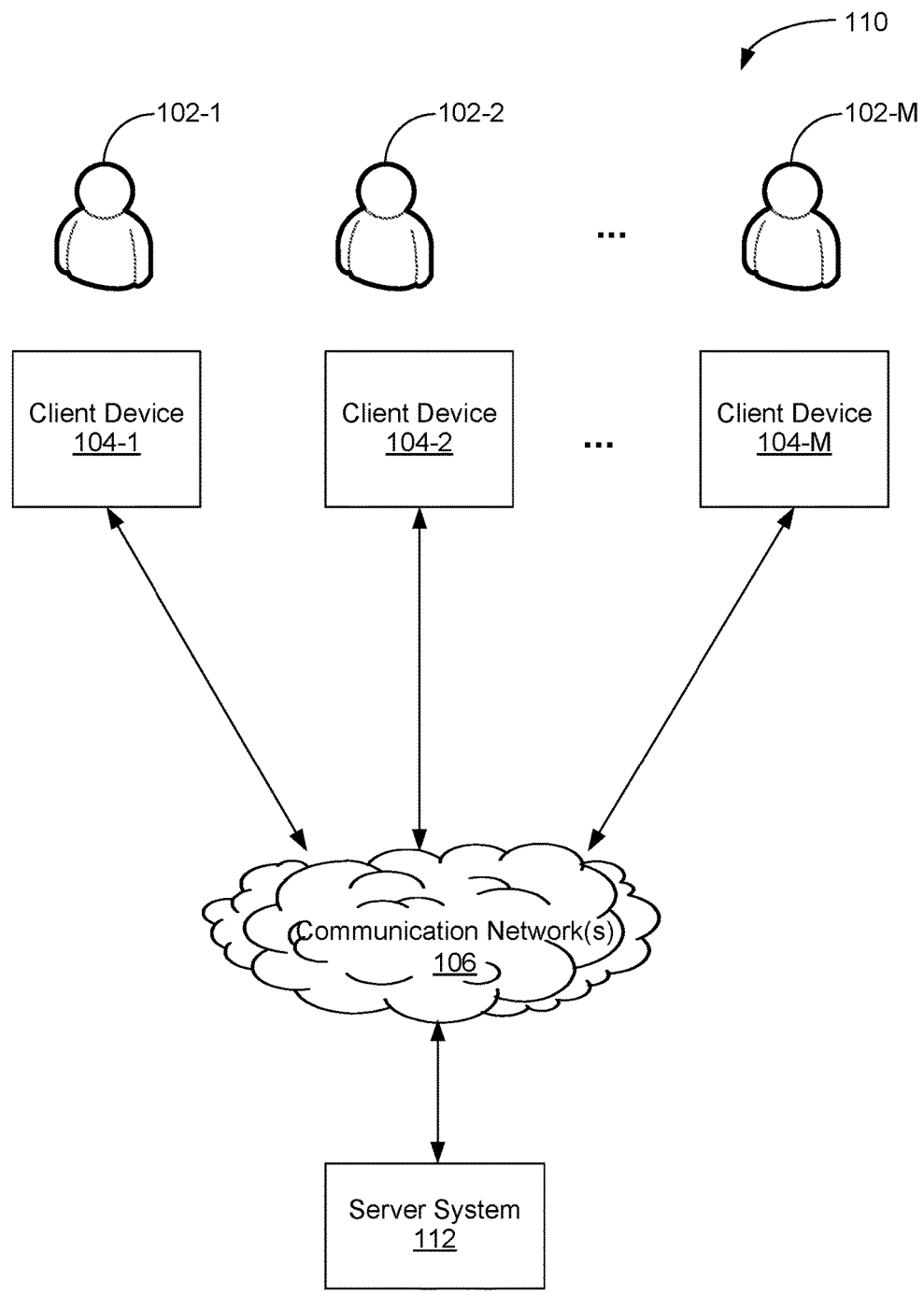

FIG. 1B illustrates a teleconference environment 110 in accordance with some embodiments. The teleconference environment 110 includes similar elements as teleconference environment 100, with the addition of a server system 112. In teleconference environment 110, the client devices 104 communicate with the server system 112 to establish a teleconference session. The client devices 104 transmit teleconference data to the server system 112, and the server system 112 transmits the teleconference data to the client devices 104. In other words, the server system 112 serves as an intermediary or mediator system for the teleconference session; the client devices 104 establish a teleconference session through the server system 112 as opposed to with each other through peer-to-peer connections. In teleconference environment 110, the server system 112 processes the teleconference data to determine the quality signals and metrics, indexes the signals and metrics to timestamps in the teleconference session, and generates the information for transmission to the client devices 104 for presentation, whether during the teleconference or after. In some embodiments, the server system 112 also stores the teleconference data and the determined quality signals and metrics, so that they can be accessed after the end of the teleconference session. Thus, teleconference environment 110 is similar to teleconference environment 100 described above, but in the teleconference environment 110 the operations related to the signals and metrics and information generation associated with the signals and metrics, as well as the establishment of the teleconference session and the distribution of the teleconference data, are performed by the server system 112.

Figure 2A:
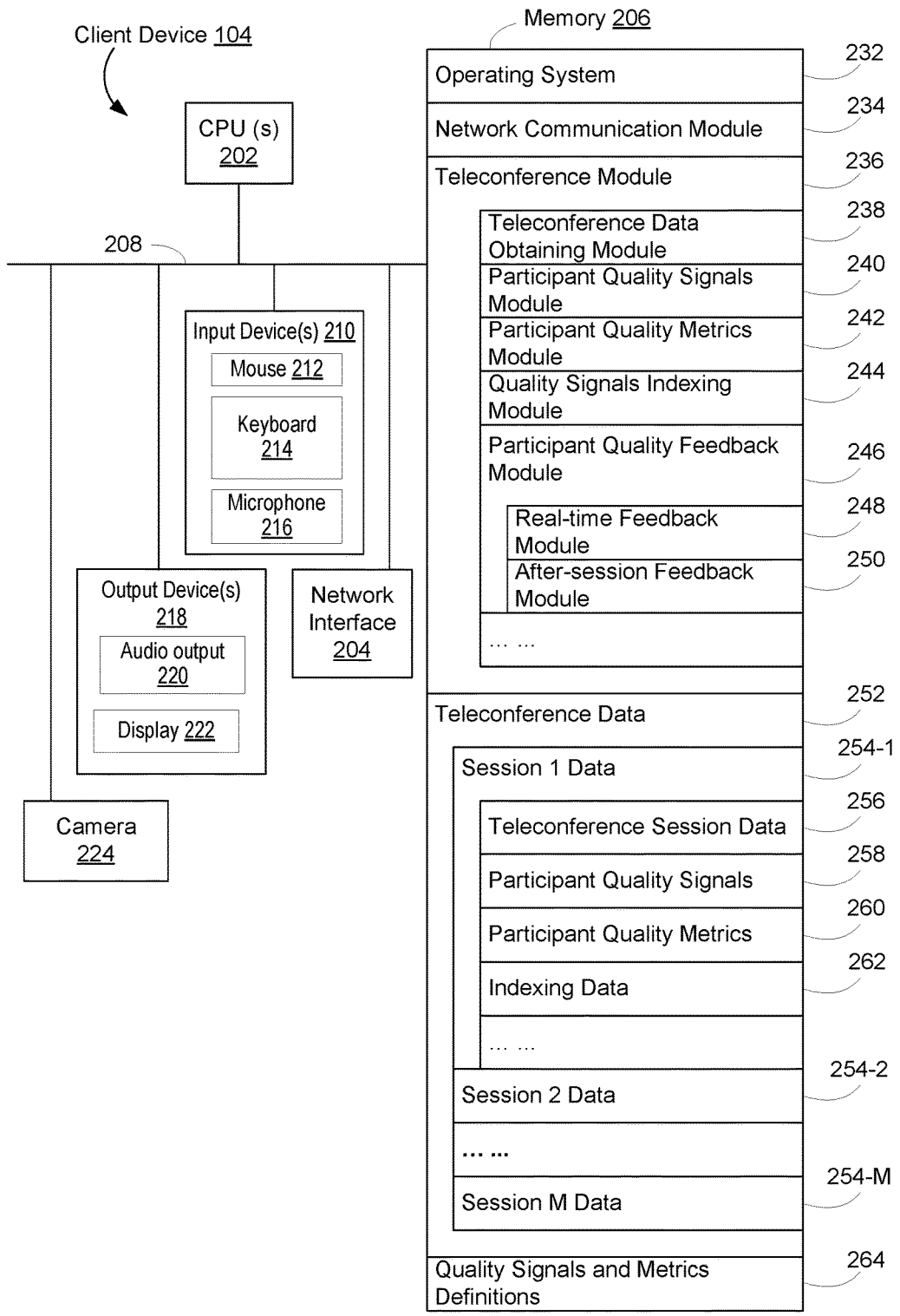
FIG. 2A is a block diagram illustrating an example client device in accordance with some embodiments.

FIG. 2A is a block diagram illustrating a client device 104, in accordance with some embodiments. The client device 104 typically includes one or more processing units (CPU's) 202, one or more network or other communications interfaces 204, memory 206, and one or more communication buses 208, for interconnecting these components. The communication buses 208 optionally include circuitry (sometimes called a chipset) that interconnects and controls communications between system components. The client device 104 includes one or more input devices 210 including a microphone 216, and optionally a mouse 212 and/or keyboard 214. Other examples of input devices 210 include a touch-sensitive surface (e.g., a track pad, a touch pad, a touch-sensitive display), a trackball, a joystick, and a keypad. The client device 104 also includes one or more output devices 218, including an audio output device 220 (e.g., a speaker, headphones) and a display 222. In some embodiments, the client device 104 also includes a camera or other image/video capture device 224.

Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternatively the non-volatile memory device(s) within memory 206, comprises a non-transitory computer readable storage medium. In some embodiments, memory 206 or the computer readable storage medium of memory 206 store the following programs, modules and data structures, or a subset thereof:

- Operating system 232 including procedures for handling various basic system services and for performing hardware dependent tasks;
- Network communication module 234 for connecting the client device 104 to, and facilitating communication with, other devices, computers, and systems (e.g., other client devices 104, server system 112) via the one or more communication network interfaces 204 (wired or wireless) and one or more communication networks 106;
- Teleconference module 236 for establishing teleconference sessions, processing teleconference data, and presenting information corresponding to quality signals and metrics of teleconferences, including:
  - Teleconference data obtaining module 238 for obtaining teleconference data;
  - Participant quality signals module 240 for determining participant quality signals from teleconference data;
  - Participant quality metrics module 242 for determining metrics from participant quality signals;
  - Quality signals indexing module 244 for indexing participant quality signals and metrics to timestamps in teleconference sessions; and Participant quality feedback module 246 for generating feedback information regarding the participant quality signals and metrics for presentation to a user;

Teleconference data 252 for storing teleconference data and corresponding determined quality signals and metrics for multiple teleconference sessions; and Quality signals and metrics definitions 264 for storing definitions, rules, heuristics, etc. for determining quality signals and metrics.

In some embodiments, the participant quality feedback module 246 includes real-time feedback module 248 for generating and presenting information in real-time, near real-time, or otherwise during the teleconference; and an after-session feedback module 250 for generating and presenting information post-teleconference.

In some embodiments, teleconference data 252 includes teleconference data and determined signals and metrics for respective sessions 254-1 thru 254-M. For a teleconference session, the data 254-1 for that session includes teleconference session data 256, which includes the audio, video, and optionally other teleconference data from the session, participant quality signals 258, participant quality metrics 260, and indexing data 262 for indexing the quality signals 258 and metrics 260 to times in the teleconference session.

In some embodiments, participant quality signal module 240 includes appropriate sub-modules for processing audio and video (e.g., audio recognition, audio analysis, natural language processing, speech-to-text, face/person recognition in video, eye gaze tracking in video, etc.) and optionally sub-modules for processing other teleconference data (e.g., network performance evaluation, keystroke detection, mouse activity detection, etc.).

In some embodiments, modules 240 and 242 may be combined into one module for determining quality signals and metrics, with appropriate sub-modules for determining respective signals and metrics.

Figure 2B:
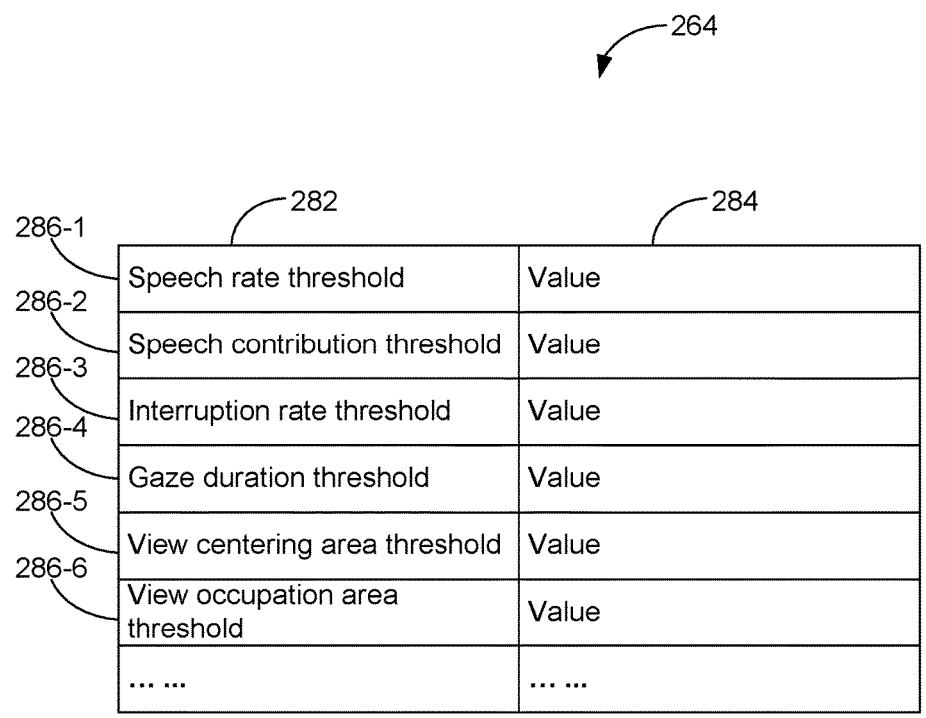
FIG. 2B is a diagram illustrating an example data structure for participant quality heuristics in accordance with some embodiments.

FIG. 2B illustrates an example partial data structure for quality signals and metrics definitions 264, in accordance with some embodiments. In the partial data structure shown, structured to include a field 282 (e.g., an identifier) and a value 284, there are multiple thresholds 286 for various quality metrics. These threshold 286 define thresholds that, when exceeded, indicate low-quality behavior or state of a user-participant. In some embodiments, exceeding of a metric triggers an alert or notification during the teleconference to the user-participant to adjust behavior or state. The definitions 264 may also include additional data structures, such as heuristics, algorithms, definitions, etc. for defining participant quality signals and metrics.

Each of the above identified elements may be stored in one or more of the previously mentioned memory devices, and each of the modules or programs corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Although FIG. 2A shows a client device, FIG. 2A is intended more as functional description of the various features which may be present in a client device than as a structural schematic of the embodiments described herein. In practice, and as recognized by those of ordinary skill in the art, items shown separately could be combined and some items could be separated.

Figure 3:
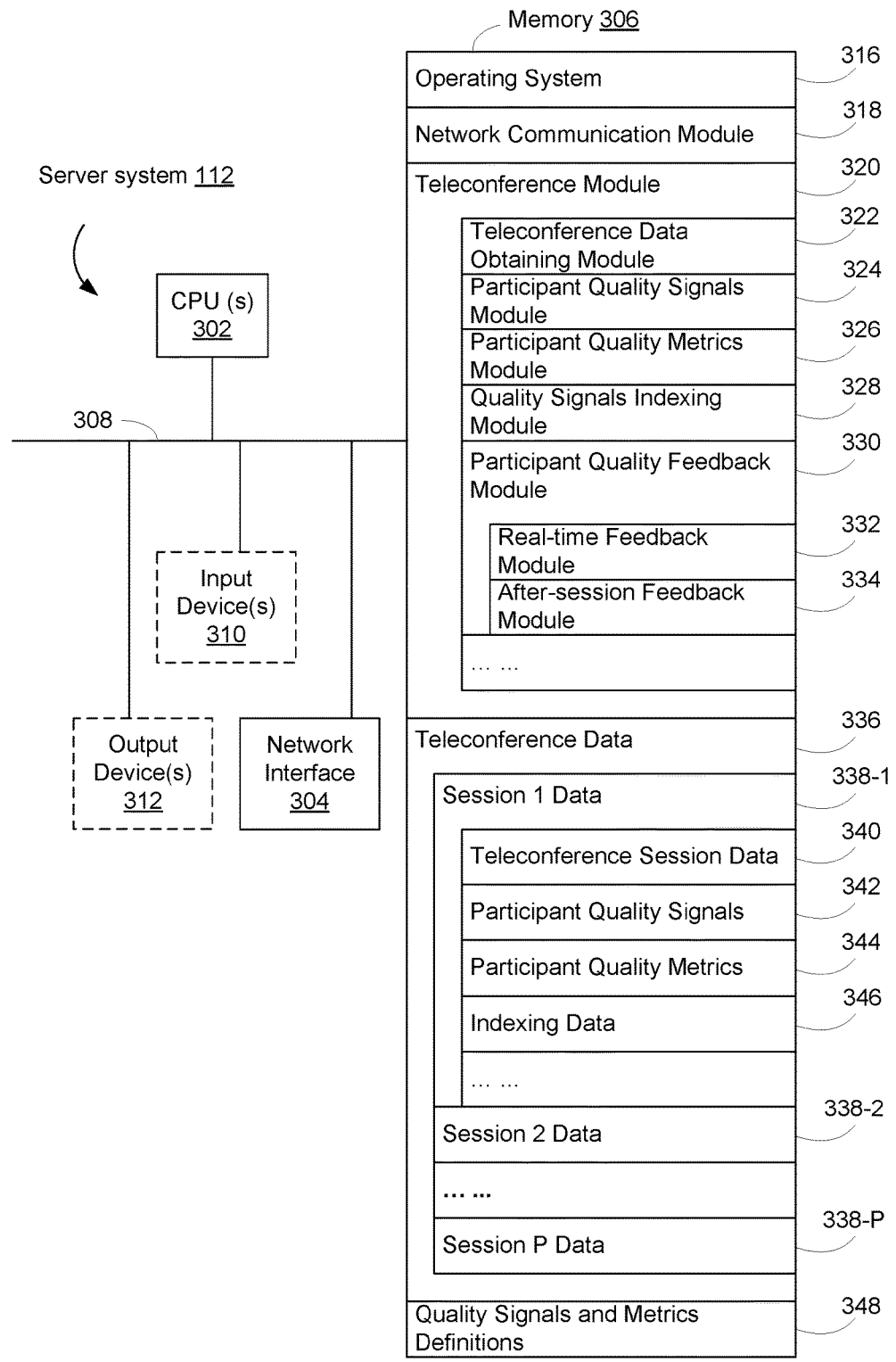
FIG. 3 is a block diagram illustrating an example server system in accordance with some embodiments.

FIG. 3 is a block diagram illustrating a server system 112, in accordance with some embodiments. The server system 112 typically includes one or more processing units (CPU's) 302, one or more network or other communications interfaces 304, memory 306, and one or more communication buses 308 for interconnecting these components. The communication buses 308 optionally include circuitry (sometimes called a chipset) that interconnects and controls communications between system components. Server system 112 optionally includes one or more input devices 310 (e.g., keyboard, mouse, touch-sensitive surface) and one or more output devices 312 (e.g., display).

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, including the non-volatile and volatile memory device(s) within memory 306, comprises a non-transitory computer readable storage medium. In some embodiments, memory 306 or the non-transitory computer readable storage medium of memory 306 stores the following programs, modules and data structures, or a subset thereof:

Operating system 316 including procedures for handling various basic system services and for performing hardware dependent tasks;

Network communication module 318 for connecting the server system 112 to, and facilitating communication with, other devices, computers, and systems (e.g., client devices 104) via the one or more communication network interfaces 304 (wired or wireless) and one or more communication networks 106;

Teleconference module 320 for establishing teleconference sessions, processing teleconference data, and generating information corresponding to quality signals and metrics of teleconferences for transmission to client devices for presentation, including:

Teleconference data obtaining module 322 for obtaining teleconference data;

Participant quality signals module 324 for determining participant quality signals from teleconference data;

Participant quality metrics module 326 for determining metrics from participant quality signals;

Quality signals indexing module 328 for indexing participant quality signals and metrics to timestamps in teleconference sessions; and Participant quality feedback module 330 for generating feedback information regarding the participant quality signals and metrics for presentation to a user;

Teleconference data 336 for storing teleconference data and corresponding determined quality signals and metrics for multiple teleconference sessions; and Quality signals and metrics definitions 348 for storing definitions, rules, heuristics, etc. for determining quality signals and metrics.

In some embodiments, the participant quality feedback module 330 includes real-time feedback module 332 for generating information in real-time, near real-time, or otherwise during the teleconference for presentation during the teleconference; and an after-session feedback module 334 for generating information for presentation post-teleconference.

In some embodiments, teleconference data 336 includes teleconference data and determined signals and metrics for respective sessions 338-1 thru 338-P. For a teleconference session, the data 338-1 for that session includes teleconference session data 340, which includes the audio, video, and optionally other teleconference data from the session, participant quality signals 342, participant quality metrics 344, and indexing data 346 for indexing the quality signals 342 and metrics 344 to times in the teleconference session.

In some embodiments, the quality signals and metrics definitions 348 include similar data structures as definitions 264 (FIGS. 2A-2B).

In some embodiments, participant quality signal module 324 includes appropriate sub-modules for processing audio and video (e.g., audio recognition, audio analysis, natural language processing, speech-to-text, face/person recognition in video, eye gaze tracking in video, etc.) and optionally sub-modules for processing other teleconference data (e.g., network performance evaluation, keystroke detection, mouse activity detection, etc.).

In some embodiments, modules 324 and 326 may be combined into one module for determining quality signals and metrics, with appropriate sub-modules for determining respective signals and metrics.

Each of the above identified elements may be stored in one or more of the previously mentioned memory devices, and each of the modules or programs corresponds to a set of instructions for performing a function described above. The set of instructions can be executed by one or more processors (e.g., the CPUs 302). The above identified modules or programs need not be implemented as separate software programs, procedures or modules, and thus various subsets of these modules may be combined or otherwise re-arranged in various embodiments. In some embodiments, memory 306 may store a subset of the modules and data structures identified above. Furthermore, memory 306 may store additional modules and data structures not described above.

Although FIG. 3 shows a server system, FIG. 3 is intended more as functional description of the various features which may be present in a single server or a set of multiple servers than as a structural schematic of the embodiments described herein. In practice, and as recognized by those of ordinary skill in the art, items shown separately could be combined and some items could be separated. For example, some items (e.g., operating system 316 and network communication module 318) shown separately in FIG. 3 could be implemented on a single server and single items could be implemented by one or more servers. The actual number of servers used to implement the server system 112 and how features are allocated among them will vary from one embodiment to another, and may depend in part on the amount of data traffic that the system must handle during peak usage periods as well as during average usage periods.

Example Participant Quality Signals and Corresponding Metrics

As described above, one or more participant quality signals may be determined for the participants in a teleconference. Examples of quality signals and corresponding metrics are described below. These examples are representative of quality signals and metrics 264 and/or 348 that are stored a client device 104 and/or a server system 112. It should be appreciated that the examples described below are not exhaustive, and additional quality signals and metrics are possible. Furthermore, it should be appreciated that a client device 104 or server system 112 may determine a subset of the signals and metrics described below.

In some embodiments, a participant quality signal is "conversational turns" taken by each participant in the teleconference. This signal may be determined from the audio data of the teleconference by detecting "conversational turns" based on uninterrupted sequences of utterances by a user-participant. A metric corresponding to this signal is the number (absolute or average per unit time) of such turns taken by each user-participant during the teleconference. In some embodiments, a higher number of turns is an indication of more back and forth in the teleconference and thus more engagement amongst the user-participants.

In some embodiments, a participant quality signal (and corresponding metric) is the length of "conversational turns." This signal may be determined from the audio data of the teleconference by determining the average/median time length (e.g., how many seconds) of the "conversational turns" by the user-participants in the teleconference. In some embodiments, a user-participant with longer turns is considered to be more dominant in the teleconference.

In some embodiments, a participant quality signal is one-word (or otherwise short) responses by user-participants. This signal may be determined from the audio data of the teleconference by identifying short "conversational turns" (e.g., turns that are shorter than a certain time threshold (e.g., 800 milliseconds), turns that include just one or two words). A corresponding metric may be the number of such short turns by a user-participant. In some embodiments, a user-participant with a higher number of such short turns is considered to be less dominant in the teleconference.

In some embodiments, a participant quality signal is patterns of repeated one-word (or otherwise short) responses. This signal may be determined from the audio data of the teleconference by identifying patterns in the audio where one user-participant makes a relatively medium-to-long utterance (e.g., utterance of more than a threshold time length) followed by another user-participant making a short utterance (e.g., utterance of less than a threshold time length, a utterance with just one or two words). A corresponding metric may be the number of such patterns. In some embodiments, a high number of such patterns indicate a more instances of closed-ended questions in the teleconference or that a certain user-participant may be under-contributing speaking-wise.

In some embodiments, a participant quality signal (and corresponding metric) is the volume of speech by the user-participants. This signal may be determined from the audio data of the teleconference by measuring the volume of the user-participants' speech inputs. In some embodiments, a louder user-participant is considered to be more engaged and more dominant in the teleconference.

In some embodiments, a participant quality signal is the pitch of the speech of the user-participants. This signal may be determined from the audio data of the teleconference by, for example, calculating a fast Fourier transform of the audio data of the teleconference over time and measuring variances in spectral values. A corresponding metric is the amount of variance. In some embodiments, a more varied pitch indicates a more engaged and/or affiliative participant.

In some embodiments, a participant quality signal is the presence of open-ended questions in the teleconference, and a corresponding metric is a number of such open-ended questions. This signal may be determined from the audio data of the teleconference by, for example, identifying open-ended questions in the speech (e.g., by analyzing the sentences in the speech) or response utterances that are longer than the question utterance.

In some embodiments, a participant quality signal is pauses, and a corresponding metric is the lengths of pauses before and after each "turn" by a user-participant and average and/or median values of such per user-participant. This signal may be determined from the audio data of the teleconference by, for example, measuring the length of the pauses before and after each turn. In some embodiments, longer pauses before a user-participant's turn may indicate that the user-participant is less dominant. In some embodiments, shorter pauses overall may indicate greater fluidity in the speech of the user-participants.

In some embodiments, a participant quality signal is eye contact. This signal may be determined from the video data of the teleconference data by, for example, using computer vision face tracking techniques for eye gaze tracking. A metric corresponding to this signal is the length or amount of time the eye gaze is centered (e.g., gaze is on the camera, gaze is on video of the other user-participant(s)). In some embodiments, more time that the gaze is centered indicates more engagement.

In some embodiments, a participant quality signal is nodding. This signal may be determined from the video data of the teleconference data by, for example, using computer vision face tracking techniques for head positioning and movement. A metric corresponding to this signal is the number of times the user-participant nodded. In some embodiments, more nodding indicates more engagement.

In some embodiments, a participant quality signal is the user-participant's face position and coverage. This signal may be determined from the video data of the teleconference data by, for example, using computer vision face tracking techniques to measure how much of the field of view the face covers. A metric corresponding to this signal is a percentage of the field of view that the user-participant's face covers. In some embodiments, more coverage of the field of view by the face indicates more engagement.

In some embodiments, a participant quality signal is typing or mouse activity by a user-participant. This signal may be determined from the user input data of the teleconference data by, for example, listening for key strokes, mouse clicks, and/or mouse movement. A metric corresponding to this signal is the length or amount of time a user-participant engages in typing or mouse activity. In some embodiments, more typing or mouse activity indicates less engagement. In some embodiments, typing or mouse click activity may also be used as a signal for adjusting the microphone 216 to reduce capture of unwanted keystroke or mouse click noise.

In some embodiments, a participant quality signal is network performance during the teleconference. This signal may be determined (e.g., from network performance data of the teleconference data) by tracking the actual bandwidth available, transmission rate, latency, dropped packets, etc. captured in network statistics obtained from the client devices 104. The corresponding metrics are the available bandwidth, transmission rates, latency, dropped packets, etc. In some embodiments, network performance may be used to alert user-participants of the potential for poor quality audio/video or that a user-participant may be missing parts of the teleconference.

In some embodiments, a participant quality signal is interruptions by user-participants, and a corresponding metric is a number of interruptions initiated. This signal may be determined from the audio data of the teleconference by detecting when a user-participant starts speaking before another user-participant finishes speaking and distinguishing between successful and unsuccessful interruptions based on whether the interrupted participant yields. In some embodiments, a higher number of interruptions initiated by a user-participant indicates a more dominant user-participant.

In some embodiments, a participant quality signal, and the corresponding metric, is the amount of time spoken by each speaker. This signal may be determined from the audio data of the teleconference by processing the audio data to determine the amount of time each user-participant speaks. In some embodiments, more talking by a user-participant indicates a more dominant user-participant.

In some embodiments, a participant quality signal, and the corresponding metric, is the rate of speech by each speaker. This signal may be determined from the audio data of the teleconference by processing the audio data to calculate the rate of speech per user-participant. In some embodiments, a higher rate of speech by a participant indicates more engagement.

In some embodiments, a participant quality signal is smiling by the user-participants, and a corresponding metric is a number of smiles per participant. This signal may be determined from the video data of the teleconference data by processing and analyzing the video data to detect smiling by the participants. In some embodiments, more smiling indicates a more positive affect.

Other examples of participant quality signals and metrics include filler or pause words (e.g., "um," "uh") in the participants' speech, body position in the field of view, and question asking (e.g., utterances with rising tone at the end, utterance that lead with predefined interrogative words).

Example User Interfaces

Figure 4A:
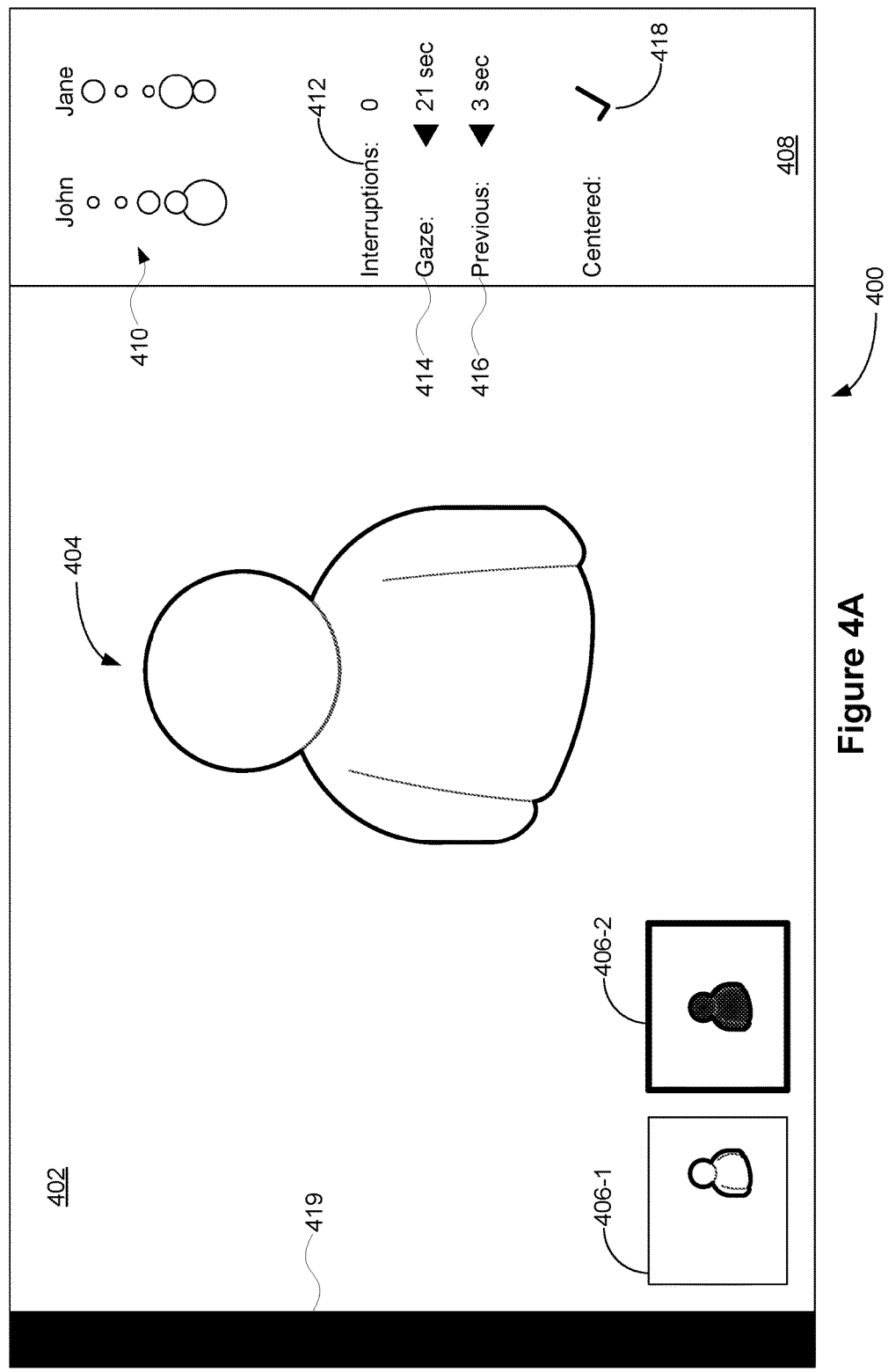
FIG. 4A is an illustration of an example user interface for a teleconference in accordance with some embodiments.

FIG. 4A illustrates an example teleconference user interface in accordance with some embodiments. User interface 400 may be displayed at a user-participant 102's client device 104 while the teleconference session is active. In some embodiments, the user interface 400 is displayed at each client device 104 in the teleconference, with the views and information presented in the user interface specific to the client device 104. For ease of description, the user interface 400 is described below is from the perspective of client device 104-1 (i.e., the user interface 400 as displayed at client device 104-1) and user 102-1 using client device 104-1 to participant in the teleconference.

User interface 400 may include a video view 402 showing another user-participant 404 (e.g., a user 102 other than user 102-1) of the teleconference (e.g., the video view 402 shows the video feed from the camera of a client device 104 other than 104-1 in the teleconference). Also included in the user interface are video thumbnails 406 of one or more user-participants in the teleconference (e.g., video thumbnail 406-1 of the video feed from a client device 104 other than 104-1 in the teleconference and video thumbnail 406-2 of the video feed from client device 104-1). In some embodiments, there is a video thumbnail 406 for each client device 104 in the teleconference. In some embodiments, if a client device 104 in the teleconference is not transmitting video data (e.g., the client device 104 is participating audio-only), a static image (e.g., an avatar image) may be displayed in the thumbnail 406. In some embodiments, avatar image thumbnails may be displayed instead of video in the thumbnails 406.

In some embodiments, a thumbnail 406 may be displayed with highlighted borders (e.g., significantly thicker borders, borders of a predefined color) if the corresponding user is determined to be interrupting another user in the teleconference. For example, the borders around thumbnail 406-2 are highlighted, indicating that the user 102-1 corresponding to thumbnail 406-2 is determined to be currently interrupting another user in the teleconference.

User interface 400 also includes a region or panel 408 that presents participant quality signals and metrics relevant to user 102-1. The panel 408 may include a visualization 410 of participant contribution, a count 412 of interruptions by the user 102-1, an indication 414 of current or ongoing gaze by the user 102-1, and an indication 416 of the previous gaze by the user 102-1. The current gaze indication 414 shows a direction (e.g., with an arrow) and timer of the user 102-1's current off-center gaze, and the previous gaze indication 416 shows a direction (e.g., with an arrow) and amount of time of the user 102-1's last off-center gaze. Panel 408 may also include an indication 418 of the user 102-1's face/body position. The position indication 418 indicates whether the user 102-1's face or body position is centered (e.g., a checkmark indicates that the face/body is centered, an X mark indicates the face/body is off-center).

In some embodiments, a highlighted bar 419 (e.g., a bar of a predefined color) is displayed in user interface 400 to indicate to user 102-1 when the user 102-1 is currently gazing off-center during the teleconference and has gazed for more than a threshold amount of time. The bar 419 is positioned within user interface 400 in the direction of the gaze. For example, bar 419 is positioned to the left; user 102-1 is gazing leftward. In this manner, the bar 419 alerts the user 102-1 that he is gazing, so that he can adjust his gaze.

Figure 4B:
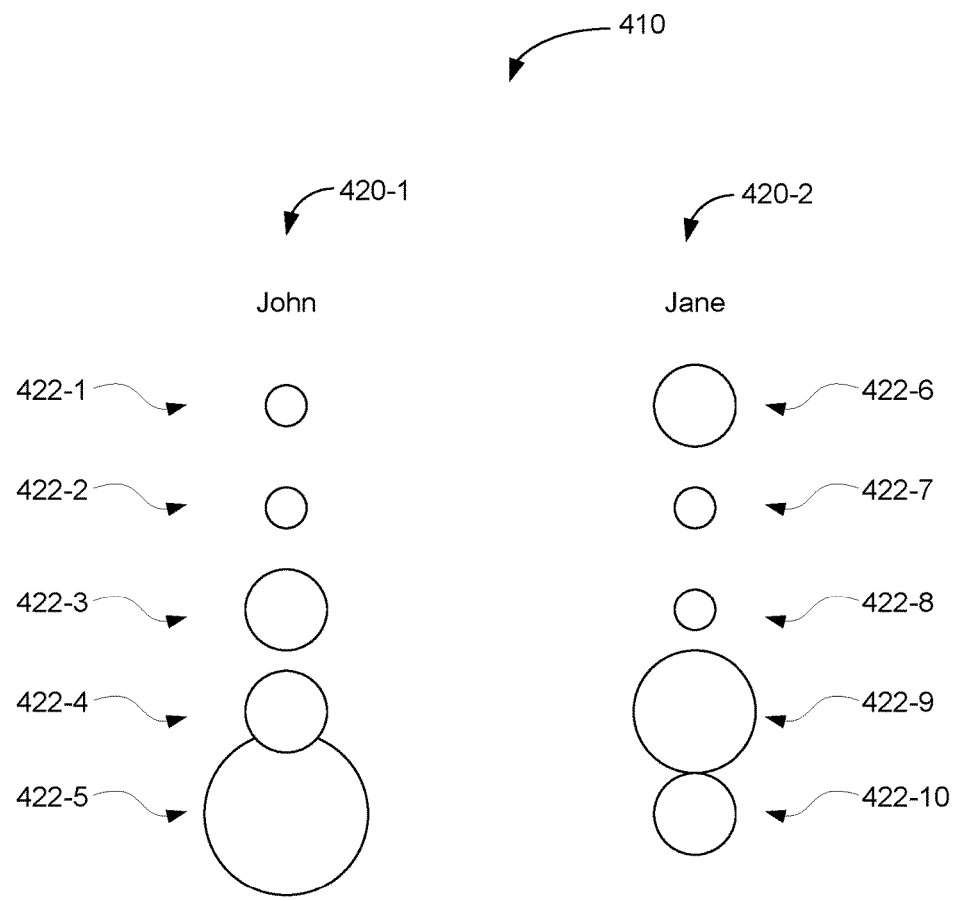
FIG. 4B is an illustration of an example visualization of speaker contribution metrics in accordance with some embodiments.

FIG. 4B illustrates an example visualization of speaker contribution metrics in accordance with some embodiments. FIG. 4B illustrates a scaled-up view of the participant contribution visualization 410. The participant contribution visualization 410 includes columns 420 for two or more participants of the teleconference, one column 420-1 for the user 102-1 (named "John" in FIGS. 4A-4B), and one or more additional columns 420 for other respective user-participants 102 of the teleconference (one additional column 420-2 is shown in FIGS. 4A-4B for another user 102 named "Jane"). For each column 420, there are one or more shapes 422 (e.g., circles) to indicate the corresponding user's speaking contribution (i.e., amount of seconds the user spoke) in the teleconference. For example, in column 420-1 there are shapes 422-1 thru 422-5, and in column 420-2 there are 4221-6 thru 422-10. In some embodiments, shapes 422-1 and 422-6 are aligned horizontally (e.g., aligned in a row), shapes 422-2 and 422-7 are aligned horizontally (e.g., aligned in another row), and so forth.

For a column 420, each shape 422 visualizes or otherwise indicates the corresponding user's speaking contribution over a defined time period; the size of the shape indicates the amount of the contribution. In some embodiments, the defined period is 60 seconds, and the shapes represent the number of seconds in which the user spoke, with the sizes of the shapes increasing with a higher number speaking seconds. The top-most shapes 422-1 and 422-6 are dynamically updated in real time (e.g., second by second), and show the corresponding user's real time speaking contribution in a rolling 60-second window up to the present time. Other shapes in the columns show the user's contribution in previous 60-second windows. Shapes are aligned horizontally, so that the contributions of the users for the same time period can be compared. For example, shapes 422-1 and 422-6, which are aligned horizontally, indicate the contributions of John and Jane, respectively, in the rolling 60-second window. Shapes 422-2 and 422-7, which are also aligned horizontally, indicate the contributions of John and Jane, respectively, in a past 60-second period. Shapes 422-3 and 422-8, which are also aligned horizontally, indicate the contributions of John and Jane, respectively, in a 60-second period immediately preceding the 60-second period to which shapes 422-2 and 422-7 correspond, and so forth. In some embodiments, the shapes corresponding to past time periods are static. In some embodiments, for each column 420 there is one dynamically updated shape (e.g., shape 422-1, 422-6) to indicate the user's real time contribution, and there are one or more additional shapes, up to a predefined amount, in the column (e.g., shapes 422-2 thru 422-5, 422-6 thru 422-10) to indicate the user's recent speaking contribution history.

Thus, for example, in FIG. 4B, based on the sizes of the shapes 422-1 and 422-6, Jane has more speaking contribution in the teleconference in the last 60-seconds. Based on the sizes of the shapes 422-2 and 422-7, in the prior 60-second window, John and Jane's contributions were approximately equal. Based on the sizes of the shapes 422-5 and 422-10, in a 60-second window further in the past, John had a larger contribution than Jane In some embodiments, the number of seconds spoken in the immediately preceding 60-second window is subtracted from the speaking amount in the current 60-second window when the user is silent. In this manner, the shape sizes are more display space-efficient.

Figure 5:
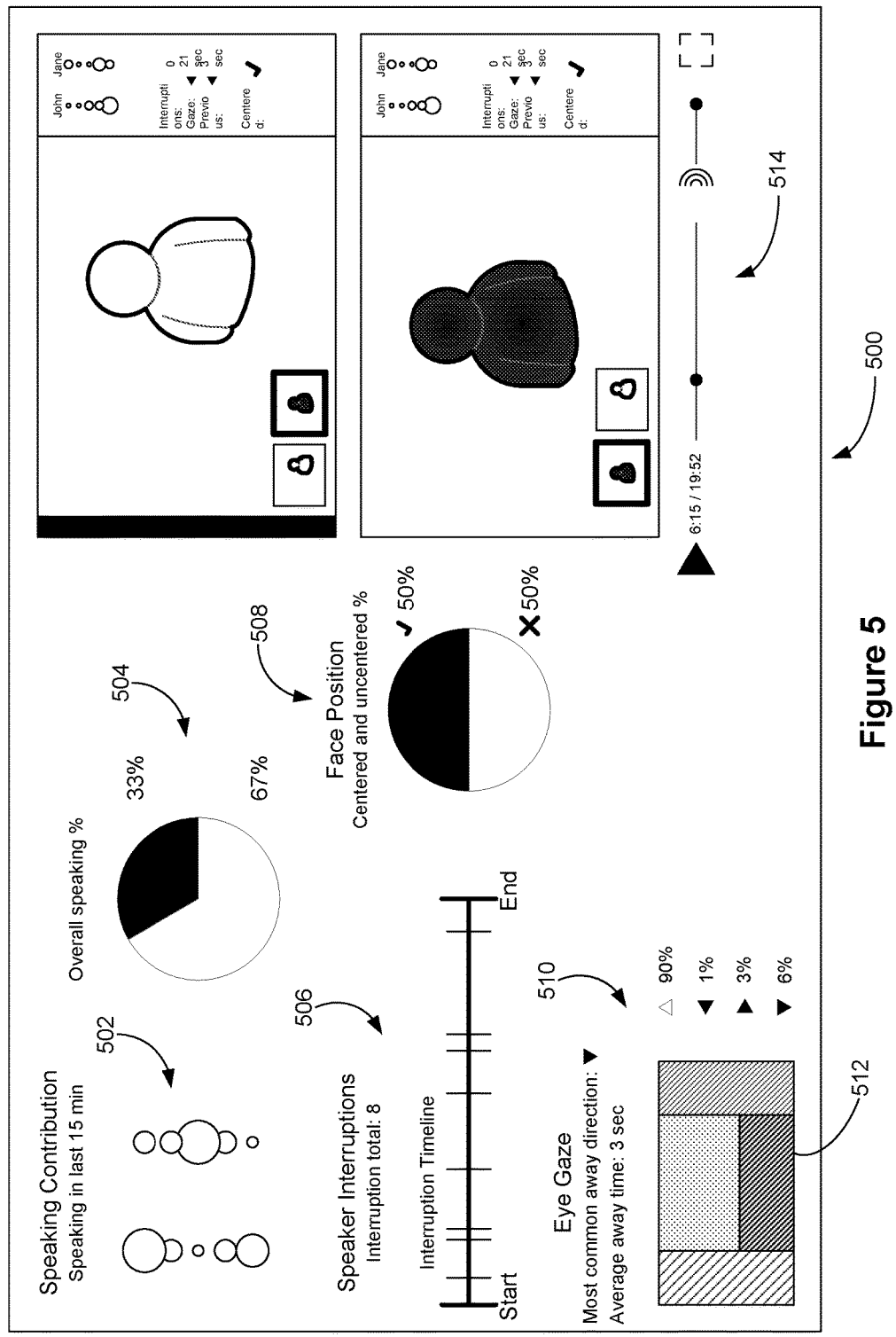
FIG. 5 is an illustration of an example user interface for post-teleconference participant quality feedback in accordance with some embodiments.

FIG. 5 is an illustration of an example user interface for post-teleconference participant quality feedback in accordance with some embodiments. FIG. 5 illustrates a post-teleconference summary user interface 500. The summary user interface 500 includes various charts, graphs, visualizations, and other indications of the participant quality signals and metrics that have been determined for a teleconference session. For ease of description, summary user interface 500 is described as if user interface 500 is displayed at client device 104-1 to user 102-1.

The summary user interface 500 includes a post-teleconference speaker contribution visualization 502. Speaker contribution visualization 502 is similar to visualization 410 in that visualization 502 shows the contributions of user 102-1 and one or more other users 102, and also employs shapes whose sizes convey the amount of speaker contribution. Visualization 502 shows the speaker contributions in a defined time period (divided into time windows) at the tail end of the teleconference session (e.g., last 15 minutes of the teleconference). In some embodiments, the shapes in visualization 502 are static, as the teleconference session is already over. In some embodiments, the time windows in visualization 502 may be larger than in visualization 410 (e.g., 3-minute windows instead of 60-second windows).

Summary user interface 500 also includes an overall speaking contribution pie chart 504 showing the overall speaking contributions, by percentage, of the user-participants in the teleconference session.

Summary user interface 500 also includes a speaker interruption graphic 506 that shows a count of total interruptions by user 102-1 and a teleconference timeline with the interruptions by user 102-1 marked on the timeline.

Summary user interface 500 also includes a face/body position pie chart 508 showing the percentages of the teleconference that the face/body position of the user 102-1 was centered and off-center, respectively.

Summary user interface 500 also includes an eye gaze graphic 510 that shows a most common gazing direction of the user during the teleconference session, an average gazing time, and a gazing heat map chart 512. Gazing heat map chart 512 shows directions of the user 102-1's gazing during the teleconference by region, with the shading of the region indicating the amount of gazing in the respective direction. In some embodiments, in gazing heat map chart 512, the upper center region corresponding to the direction of "acceptable" gazing by users is colored green; and the off-center gazing regions (left, right, lower center) are colored red if there is gazing in the respective direction (with the shading intensity indicating the amount of gazing), and colored white if there is no gazing in the respective direction.

Summary user interface 500 also includes teleconference data player interface 514. The teleconference data player interface 514 includes media playback controls, such as a play/pause button, a playback time indicator, a scrubber, volume control, and a button to go into full-window mode or back. The user 102-1 may use the teleconference data player interface 514 to play back the teleconference audio and video and user interface 400 of himself and optionally one or more other users 102 in the teleconference. In this way, the user 102-1 can review his behavior and state during the teleconference.

In some embodiments, the elements 502, 504, 506, 508, and 510 may dynamically update as the user 102-1 plays back the teleconference using the player interface 514 to reflect the signals and metrics as of the playback position. In this way, the user 102-1 can see how the signals and metrics changed over the duration of the teleconference. Because the quality signals and metrics are indexed to timestamps in the teleconference, the elements 502, 504, 506, 508, and 510 can represent the signals and metrics as of the playback position time in the player interface 514.

It should be appreciated that summary user interface 500 and the elements included therein are merely examples. More or less elements may be included, and alternative ways of showing the same signals and metrics in the user interface 500 are possible.

Example Processes

Figure 6:
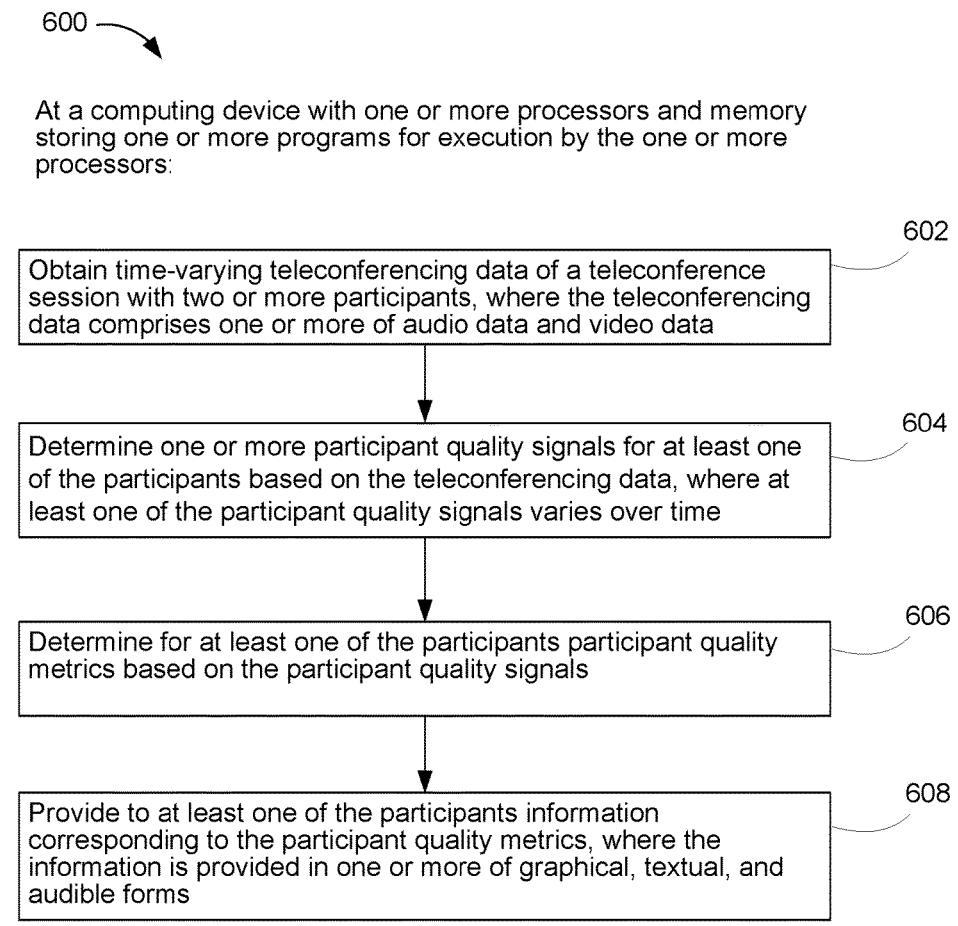
FIG. 6 is a flow diagram of an example method for providing teleconference participant quality feedback in accordance with some embodiments.

FIG. 6 illustrate a flow diagram 600 of a method for providing teleconference participant quality feedback in accordance with some embodiments. In some embodiments, the method 600 is performed at a computing device with one or more processors and memory storing one or more programs for execution by the one or more processors (e.g., at a client device 104 in a telepresence environment 100, at a server system 112 in a teleconference environment 110).

The device obtains (602) time-varying teleconferencing data of a teleconference session with two or more participants, where the teleconferencing data comprises one or more of audio data and video data. The teleconference data obtaining module 238 or 322 obtains the teleconference data from an established and in-progress teleconference session (e.g., from the stream of teleconference data being sent and received from the client device 104 or server system 112, respectively). The teleconference data includes audio data and video data, and optionally additional data (e.g., other content such as screen sharing data, documents, user input data (e.g., keystrokes, mouse clicks, cursor movements), notes, chats, and other information shared during the teleconference). The teleconference data are useful both as inputs for the determination of quality signals and metrics and for post-teleconference indexed review.

The device determines (604) one or more participant quality signals for at least one of the participants based on the teleconferencing data, where at least one of the participant quality signals varies over time. At a client device 104, the participant quality signals module 240 therein processes the teleconference data 252 of the teleconference session to determine one or more participant quality signals for at least the user 102 associated with the client device 104 and optionally additional users 102. At the server system 112, participant quality signals module 324 therein processes the teleconference data 336 to determine one or more participant quality signals for one or more user-participants 102 (e.g., user-participants 102 that authorize the determination). The signals, whether determined by participant quality signals module 240 or participant quality signals module 324, vary over time as the teleconference progresses and the module 240/324 determines the signals over the duration of the teleconference session as new teleconference data is obtained.

The device determines (606) for at least one of the participants participant quality metrics based on the participant quality signals. At a client device 104, the participant quality metrics module 242 therein determines one or more participant quality metrics based on the determined signals for at least the user 102 associated with the client device 104 and optionally additional users 102. At the server system 112, participant quality metrics module 326 therein determines one or more participant quality metrics based on the determined signals for one or more user-participants 102 (e.g., user-participants 102 that authorize the determination). The metrics, whether determined by participant quality metrics module 242 or participant quality metrics module 326, also vary over time as the teleconference progresses and the module 242/326 determines the metrics over the duration of the teleconference session as the signals are determined over the duration of the teleconference session.

The device provides (608) to at least one of the participants information corresponding to the participant quality metrics, where the information is provided in one or more of graphical, textual, and audible forms. At a client device 104, the participant quality feedback module 246 generates information corresponding to the signals and metrics, and presents the information at the client device 104 to the user 102 associated with the client device 104 (e.g., displays user interface 400 or 500, output an audible alert). At the server system 112, the participant quality feedback module 330 generates information (e.g., user interface 400 or 500, the audio for an audio alert) corresponding to the signals and metrics, and transmits the information to a client device 104 for presentation. In some embodiments, the server system 112 transmits the signals and metrics data to the client device 104, which generates and presents the information (e.g., user interface 400 or 500, the audio for an audio alert).

In some embodiments, the provided information includes audible information (e.g., an audible notification or warning), graphical information, and/or textual information. The graphical and/or textual information may be presented in a user interface (e.g., user interface 400 or 500).

In some embodiments, obtaining time-varying teleconferencing data of a teleconference session includes obtaining the teleconferencing data in real time during the teleconference session. The teleconference data obtaining module 238 or 322 obtains the teleconference data from an established and in-progress teleconference session (e.g., from the stream of teleconference data being sent and received from the client device 104 or server system 112, respectively) in real time as the teleconference is on-going.

In some embodiments, determining one or more participant quality signals for at least one of the participants based on the teleconferencing data includes determining the participant quality signals in real time during the teleconference session, and determining for at least one of the participants participant quality metrics based on the participant quality signals includes determining the participant quality metrics in real time during the teleconference session. The signals and metrics may be determined in real time as the teleconference is on-going; the real-time signals and metrics reflect participant quality in real time throughout the teleconference.

In some embodiments, providing to least one of the participants information corresponding to the participant quality metrics includes providing the information in real time during the teleconference session. The information may be provided in real time (e.g., displayed in the teleconference user interface 400, transmitted to a client device 104) during the teleconference.

In some embodiments, providing the information in real time during the teleconference session includes providing to the at least one of the participants one or more prompts to adjust behavior and/or position associated with the participant quality signals during the teleconference session. Notifications, alerts, or other indications of low-quality behavior or state may be presented during the teleconference. For example, bar 419 may be displayed in user interface 400 during the teleconference to draw the user's attention to his gazing. As another example, the user's thumbnail 406-2 may be highlighted to indicate that he is interrupting. As a further example, position indicator 418 shows whether the user's position is centered, and speaking contribution visualization 410 shows the user's updated speaking contribution in comparison to another user. These displayed elements serve to alert the user of low-quality behavior or state. Furthermore, audio alerts or notifications may be presented during the teleconference to alert the user of low-quality behavior or state.

In some embodiments, a prompt may be presented in one or more modalities, and the modalities used may depend on the situation and the context of the user-participant. For example, a prompt may be presented via audio rather than visually in the case that there is a disruption in the video stream or if presenting a visual prompt would interfere with the communication. Modalities may be visual (textual, iconic, graphical), audio (verbal, tones, sounds), vibrotactile (buzz, pulses), or other modalities of actuators connected to the client device.

In some embodiments, a prompt provides not only feedback about a metric (e.g., visualization of the metric), but also provides to the user-participant instructions or guidance for behavior or position change that does not require the user-participant to interpret the metric on his own.

For example, when the rate of speech of a user-participant exceeds a predefined threshold or a threshold set based on the user's prior behavior, a prompt that instructs the user to speak more slowly and/or clearly may be presented to the user. A desired consequence of the change is that the user speaks more slowly and clearly so the other users can better understand the speaking user.

For example, when a user-participant's speaking contribution exceeds a predefined threshold based on the number of other user-participants in the teleconference, a prompt that instructs the user to speak less and listen more may be presented to the user. A desired consequence of the change is that the user does not overly dominate the teleconference so that other users in the teleconference can contribute more.

For example, when a user-participant's number of successful interruptions of other users exceeds a certain rate in a period of time (e.g., a predefined threshold rate), a prompt that instructs the user to allow others to finish speaking before the user starts speaking may be presented to the user. A desired consequence of the change is that the user does not interrupt the other users and talk over them.

For example, when a user-participant's cumulative duration of non-centered gaze exceeds a threshold (e.g., a predefined fixed threshold, a threshold relative to the amount of time in the current teleconference, a threshold that varies systematically throughout the teleconference), a prompt that instructs the user to re-establish eye contact with the other users more often may be presented to the user. A desired consequence of the change is that the user is able to uses eye gaze more effectively to convey attentiveness.

For example, when the portion of the field of view corresponding to (e.g., filled by) the user's detected face/body is smaller than a predefined threshold, a prompt that instructs the user to get closer to the camera so others can see the user better may be presented to the user. A desired consequence of the change is that others in the teleconference can see the user better, and thus the user can more effectively user facial and body expressions to communicate non-verbally.

For example, when a confidence level in detecting the user's face in the camera view is below a threshold, or when face detection vacillates quickly between face-detected and no-face-detected states, a prompt that instructs the user to adjust lighting may be presented to the user. A desired consequence of the change is that the user can make his face more easily seen by the other users in the teleconference.

In some embodiments, providing the information in real time during the teleconference session includes providing a participant quality metrics user interface during the teleconference session, where the participant quality metrics user interface is configured to be displayed during the teleconference session concurrently with a teleconference user interface, and the information is configured to be displayed in the participant quality metrics user interface. A panel 408 may be displayed in teleconference user interface 400, and the panel includes information corresponding to participant quality metrics. For example, panel 400 includes a speaker contribution visualization 410, an interruptions count 412, current and previous gaze indicators 414 and 416, respectively, and a position indicator 418.

In some embodiments, the information includes one or more of: an indication of one of the participants interrupting another one of the participants, a count of interruptions by a participant of the participants, an indication of gazing by a participant of the participants, a duration timer of the gazing by the gazing participant of the participants, an indication of whether a participant of the participants is centered in a video view of the teleconference session, and an indication of relative speaking contributions by the participants by time period within the teleconference session. For example, user interface 400 includes an indication of one user interrupting another (e.g., highlighting of thumbnail 406-2), an indication of gazing by the user (e.g., bar 419), a timer of the user's gazing (e.g., current gaze indicator 414), an indication of whether the user's body position is centered (e.g., position indicator 418), and a speaker contribution visualization 410 that compares the user's speaking contribution with that of another user.

In some embodiments, the indication of relative speaking contributions by the participants by time period within the teleconference session includes, for a participant of the participants: a first graphical object, where a size of the first graphical object represents a relative speaking contribution of the participant over a rolling time window of a predefined time length, wherein the first graphical object is updated in real time, and a set of one or more second graphical objects, each of the second graphical objects corresponding to a past time period of the predefined time length, where a size of the second graphical object represents a relative speaking contribution of the participant within the past time period. The speaking contribution visualization 410 includes, for a user, a shape (e.g., 422-1 or 422-6) showing the real-time contribution over a rolling time period, and additional shapes (e.g., 422-2 thru 422-5 or 422-7 thru 422-10) showing contribution over prior time periods. The sizes of the shapes reflect the user's amount of contribution over the corresponding time periods, and different users' shapes for the same time period can be compared to each other.

In some embodiments, the device indexes the one or more participant quality signals to corresponding times in the teleconference session. Signals indexing module 244 or 328 indexes the determined signals and corresponding metrics to timestamps in the teleconference.

In some embodiments, the device provides the information in accordance with the indexing. For example, in user interface 500, interruption graphic 506 shows the instances of detected interruptions in a timeline of the teleconference; the detected interruptions are indexed to timestamps in the teleconference. Further, the elements in user interface 500 may show how the signals and metrics evolve as the teleconference progresses.

In some embodiments, the device provides the information after the teleconference session has ended. For example, a summary user interface 500 may be displayed post-teleconference for review of the quality signals and metrics after the teleconference is over.

In some embodiments, the device provides a participant quality summary user interface for the teleconference session, where the information is configured to be displayed in the participant quality summary user interface. For example, a summary user interface 500 may be displayed post-teleconference for review of the quality signals and metrics after the teleconference is over. The after-session feedback module 250 or 334 generates the elements (e.g., elements 502, 504, etc.) in the summary user interface 500 based on the signals and metrics for display in the summary user interface 500.

In some embodiments, the participant quality summary user interface includes a content player user interface, where the content player user interface is configured to play back the audio data and/or video data of the teleconference session and to display at least a portion of the information along with the audio data and/or video data. The summary user interface 500 includes a player interface 514 that plays back the audio/video of the teleconference data and also shows the user interfaces 400 as seen by the users in the teleconference.

In some embodiments, the post-teleconference information includes one or more of: a count of total interruptions by a participant of the participants, a timeline of interruptions by a participant of the participants over the duration of the teleconference session, an indication of amounts of gazing by direction by a participant of the participants, an indication of an average gaze time by a participant of the participants, an indication of amounts of face and/or body positioning by location by a participant of the participants, an indication of speaking contribution by the participants over the duration of the teleconference session, and an indication of relative speaking contributions by the participants by time period within the teleconference session. For example, summary user interface 500 includes an interruption graphic 506 that shows a count of total interruptions by the user and a timeline of the teleconference with the user's interruptions indicated in the timeline, an eye gaze graphic 510 that shows the amount of gazing by direction (e.g., in gaze chart 512) and average gaze time, a face/body position pie chart 508, a speaking contribution pie chart 504, and a post-teleconference speaker contribution visualization 502.

In some embodiments, the audio data includes one or more audio streams of the teleconference session. The teleconference data includes audio streams from the multiple client devices 104 in the teleconference session. In some embodiments, the multiple audio streams are input into the analysis of participant quality signals and metrics for one or more participants. For example, signals and metrics related to turn taking depends on the audio streams of the participant and other participants.

In some embodiments, the video data includes one or more video streams of the teleconference session. The teleconference data includes video streams from the multiple client devices 104 in the teleconference session. In some embodiments, the multiple video streams are input into the analysis of participant quality signals and metrics for one or more participants.

In some embodiments, the computing device is a server system, and providing to least one of the participants information corresponding to the participant quality metrics includes transmitting the information to a client device associated with the at least one of the participants for display. The server system 112 in teleconference environment 110 determines signals and metrics from the teleconference data, generates information based on the signals and metrics (e.g., user interface 400 or 500 and the information contained therein), and transmits the information to a client device 104 for presentation.

In some embodiments, a teleconference environment (e.g., environment 110) includes a central server (e.g., server system 112) that establishes teleconference sessions and processes teleconference data. In some embodiments, a teleconference environment (e.g., environment 100) may have the processing of the teleconference data streams happen locally at each client (e.g., each client device 104) in peer-to-peer connections (e.g., connected via WebRTC) without a central server. Each client will process the data streams locally to determine quality signals and metrics, and present graphical, textual, and/or audible information based on the signals and metrics on that same client.

In some embodiments, the computing device is a client device associated with one of the participants in the teleconference session, and providing to least one of the participants information corresponding to the participant quality metrics comprises displaying information. The client device 104 in teleconference environment 100 determines the signals and metrics, generates the information based on the signals and metrics, and presents (e.g., displays) the information.

In some embodiments, the device provides to a participant of the participants information corresponding to participant quality metrics of another participant of the participants. At a client device 104-1, information corresponding to participant quality signals and metrics of a user other than the user 102-1 associated with the device 104-1 may be presented to user 102-1 (with authorization of the other user).

In some embodiments, the device stores the teleconferencing data for the teleconference session, the determined participant quality signals, and the determined participant quality metrics. The client device 104 or the server system 112 stores the teleconference data (e.g., in teleconference data 252 or 336).

In some embodiments, the teleconferencing data of the teleconference session further includes user input data obtained during teleconference session from one or more of a plurality of client devices associated with the participants. The teleconference data may include user input data (e.g., keystrokes, mouse clicks, cursor movement) from the client devices 104. User input data is input for the determination of certain quality signals (e.g., typing/mouse activity by a participant).

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various embodiments, examples of which are illustrated in the accompanying drawings. In the following detailed description, numerous specific details are set forth in order to provide a thorough understanding of the invention and the described embodiments. However, the invention may be practiced without these specific details. In other instances, well-known methods, procedures, components, and circuits have not been described in detail so as not to unnecessarily obscure aspects of the embodiments.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a computing device with one or more processors and memory storing one or more programs for execution by the one or more processors:
obtaining time-varying teleconferencing data of a teleconference session with two or more participants, wherein the teleconferencing data comprises one or more of audio data and video data;
determining a participant quality signal for a respective participant of the two or more participants based on the teleconferencing data, wherein the participant quality signal varies over time;
determining, for the respective participant, a participant quality metric based on the participant quality signal, wherein the participant quality metric is indicative of an on-call behavior of the respective participant; and
providing, to the respective participant, an indication, based on the participant quality metric, of his or her on-call behavior, wherein the indication comprises:
a first graphical object indicating the behavior of the respective participant over a rolling time window of a predefined time length, wherein the first graphical object is updated in real time; and
a set of one or more second graphical objects, each second graphical object indicating the behavior of the respective participant within a respective past time period of the predefined length.

2. The method of claim 1, wherein obtaining the time-varying teleconferencing data of the teleconference session comprises obtaining the teleconferencing data in real time during the teleconference session.

3. The method of claim 2, wherein:
determining the participant quality signal for the respective participant based on the teleconferencing data comprises determining the participant quality signal in real time during the teleconference session; and
determining, for the respective participant, the participant quality metric based on the participant quality signal comprises determining the participant quality metric in real time during the teleconference session.

4. The method of claim 3, wherein:
providing, to the respective participant, the indication, based on the participant quality metric, of his or her on-call behavior comprises providing the indication in real time during the teleconference session.

5. The method of claim 4, wherein providing the indication in real time during the teleconference session comprises providing to the respective participant a prompt to adjust his or her behavior.

6. The method of claim 4, wherein providing the indication in real time during the teleconference session comprises providing a participant quality metrics user interface during the teleconference session, wherein the participant quality metrics user interface is configured to be displayed during the teleconference session concurrently with a teleconference user interface, and the indication is configured to be displayed in the participant quality metrics user interface.

7. The method of claim 1, including providing, to the respective participant, a plurality of indicia corresponding to a plurality of distinct on-call behaviors, selected from the group consisting of:
the respective participant interrupting another one of the participants;
interruptions by the respective participant of other participants;
whether the respective participant is centered in a video view of the teleconference session; and
relative speaking contributions by the participants by time period within the teleconference session.

8. A computing device, comprising:
one or more processors; and
memory storing one or more programs to be executed by the one or more processors, the one or more programs comprising instructions for:
obtaining time-varying teleconferencing data of a teleconference session with two or more participants, wherein the teleconferencing data comprises one or more of audio data and video data;
determining a participant quality signal for a respective participant of the two or more participants based on the teleconferencing data, wherein the participant quality signal varies over time;
determining, for the respective participant, a participant quality metric based on the participant quality signal, wherein the participant quality metric is indicative of an on-call behavior of the respective participant; and
providing, to the respective participant, an indication, based on the participant quality metric, of his or her on-call behavior, wherein the indication comprises:
a first graphical object indicating the behavior of the respective participant over a rolling time window of a predefined time length, wherein the first graphical object is updated in real time; and
a set of one or more second graphical objects, each second graphical object indicating the behavior of the respective participant within a respective past time period of the predefined length.

9. The device of claim 8, further comprising instructions for indexing the participant quality signal to corresponding times in the teleconference session.

10. The device of claim 9, further comprising instructions for providing the indication in accordance with the indexing.

11. The device of claim 8, further comprising instructions for providing the indication after the teleconference session has ended.

12. The device of claim 11, further comprising instructions for providing a participant quality summary user interface for the teleconference session, wherein the indication is configured to be displayed in the participant quality summary user interface.

13. The device of claim 12, wherein the participant quality summary user interface comprises a content player user interface, wherein the content player user interface is configured to play back the audio data and/or video data of the teleconference session and to display the indication along with the audio data and/or video data.

14. The computing device of claim 8, the one or more programs comprising instructions for providing, to the respective participant, a plurality of indicia corresponding to a plurality of distinct on-call behaviors, selected from the group consisting of:
the respective participant interrupting another one of the participants;
interruptions by the respective participant of other participants;
whether the respective participant is centered in a video view of the teleconference session; and
relative speaking contributions by the participants by time period within the teleconference session.

15. A non-transitory computer readable storage medium storing one or more programs, the one or more programs comprising instructions, which, when executed by a computing device with one or more processors, cause the computing device to perform operations comprising:
obtaining time-varying teleconferencing data of a teleconference session with two or more participants, wherein the teleconferencing data comprises one or more of audio data and video data;
determining a participant quality signal for a respective participant of the two or more participants based on the teleconferencing data, wherein the participant quality signal varies over time;
determining, for the respective participant, a participant quality metric based on the participant quality signal, wherein the participant quality metric is indicative of an on-call behavior of the respective participant; and
providing, to the respective participant, an indication, based on the participant quality metric, of his or her on-call behavior, wherein the indication comprises:
a first graphical object indicating the behavior of the respective participant over a rolling time window of a predefined time length, wherein the first graphical object is updated in real time; and
a set of one or more second graphical objects, each second graphical object indicating the behavior of the respective participant within a respective past time period of the predefined length.

16. The computer readable storage medium of claim 15, wherein the audio data comprises one or more audio streams of the teleconference session.

17. The computer readable storage medium of claim 15, wherein the video data comprises one or more video streams of the teleconference session.

18. The computer readable storage medium of claim 15, wherein the computing device is a server system; and
providing, to the respective participant, the indication, based on the participant quality metric, comprises transmitting the indication to a client device associated with the respective participant for display.

19. The computer readable storage medium of claim 15, wherein the computing device is a client device associated with the respective participant; and
providing, to the respective participant, the indication, based on the participant quality metric, comprises displaying information.

20. The computer readable storage medium of claim 15, wherein the one or more programs comprise instructions that cause the computing device to provide, to the respective participant, a plurality of indicia corresponding to a plurality of distinct on-call behaviors, selected from the group consisting of:
the respective participant interrupting another one of the participants;
interruptions by the respective participant of other participants;
whether the respective participant is centered in a video view of the teleconference session; and relative speaking contributions by the participants by time period within the teleconference session.

* * * * *